United States Patent
Knobbe

[11] Patent Number: 5,355,316
[45] Date of Patent: Oct. 11, 1994

[54] POSITION AIDED EVADER MANEUVERING RE-ENTRY VEHICLE NAVIGATOR

[75] Inventor: Edward J. Knobbe, Huntington Beach, Calif.

[73] Assignee: Northrop Grumman Corporation, Los Angeles, Calif.

[21] Appl. No.: 328,208

[22] Filed: Mar. 24, 1989

[51] Int. Cl.$^5$ .............................................. H04B 7/185
[52] U.S. Cl. ..................................... 364/453; 364/454
[58] Field of Search ............... 364/453, 454, 456, 457, 364/433, 449, 423, 424.01; 342/107–109, 120, 450, 462; 244/3.2, 160, 176, 179

[56] References Cited

U.S. PATENT DOCUMENTS

| | | |
|---|---|---|
| 3,184,736 | 5/1965 | Badewitz . |
| 3,214,575 | 10/1965 | Seliger et al. ..................... 364/453 |
| 3,232,103 | 2/1966 | Schneider . |
| 3,362,024 | 1/1968 | Badewitz . |
| 3,702,477 | 11/1972 | Brown ............................ 364/453 X |
| 3,990,657 | 11/1976 | Schott ........................... 244/3.14 X |
| 4,175,285 | 11/1979 | Dansac et al. . |
| 4,402,049 | 8/1983 | Gray . |
| 4,495,580 | 1/1985 | Keearns .......................... 364/454 X |
| 4,584,646 | 4/1986 | Chan et al. . |
| 4,698,635 | 10/1987 | Hilton et al. . |
| 4,882,697 | 11/1989 | Ross ................................... 364/454 |

Primary Examiner—Tod R. Swann
Attorney, Agent, or Firm—Terry J. Anderson; Karl J. Hoch, Jr.

[57] ABSTRACT

A navigation system 12 for an evasive maneuvering reentry vehicle (EMRV) 10 includes a three-axes strapdown inertial navigator 14 which includes RLGs or other types of gyroscopes and also accelerometers. An altimeter, such as a radar altimeter 16, which is normally provided on the EMRV 10, provides an output (h) to the navigation system 12, the output being expressive of the altitude of the EMRV 10 from the earth's surface. The altitude measurement output (h) is processed by a statistical filter, such as a Kalman filter 18, in conjunction with the inertial solution ($\bar{X}$) from the navigator 14. The output of the filter 18 is an estimated inertial correction which is combined with the inertial position and velocity output of the navigator 14 at a block 20 to yield a corrected position and velocity output. It is shown that a single altitude measurement is sufficient to derive three position and three velocity compensations for the EMRV 10.

6 Claims, 2 Drawing Sheets

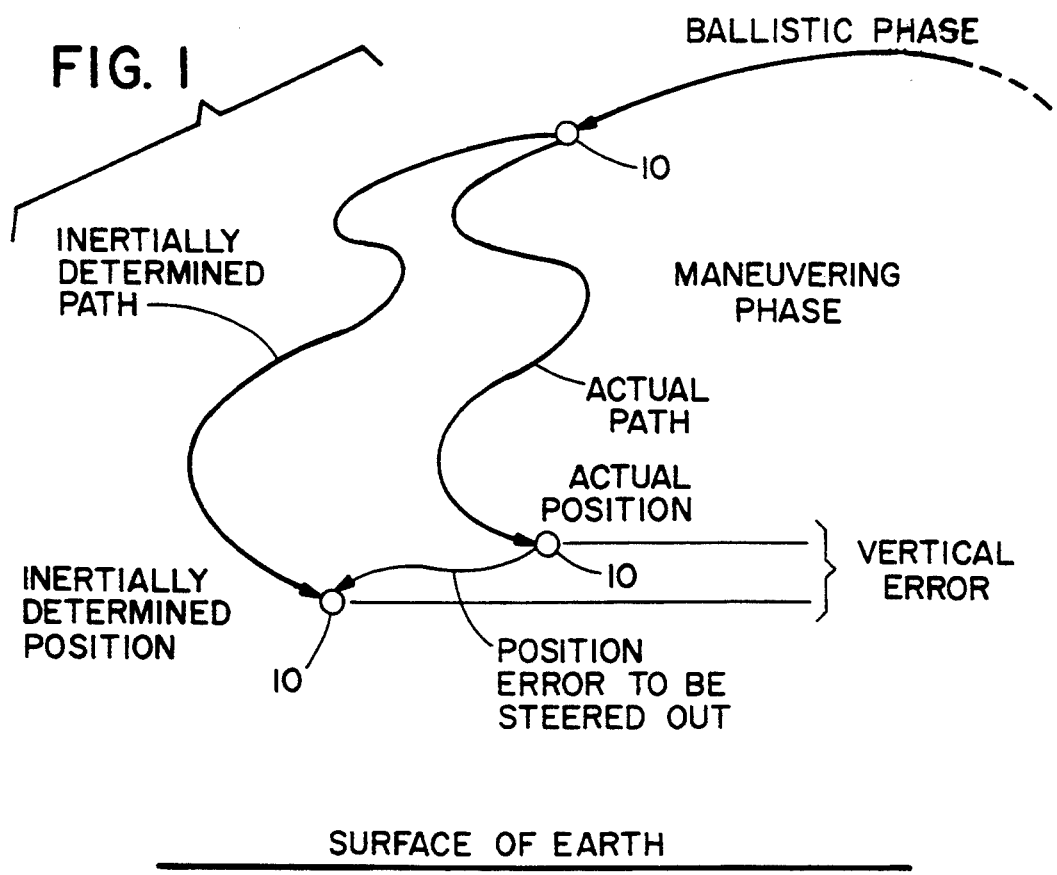
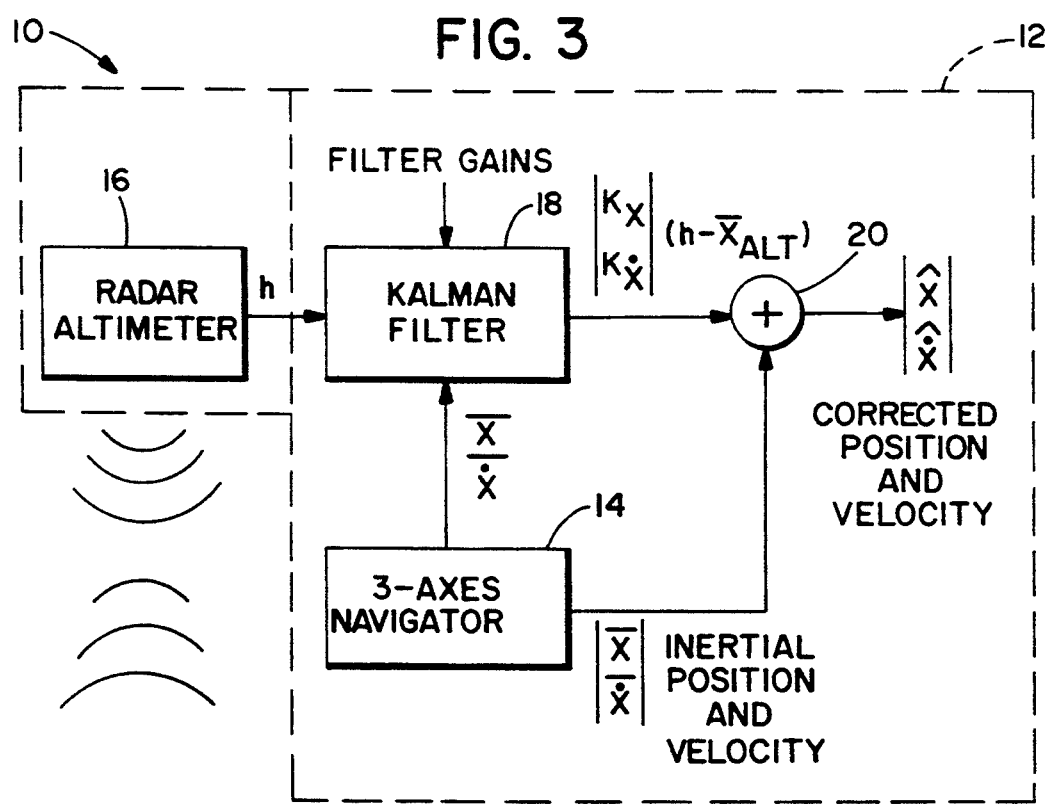

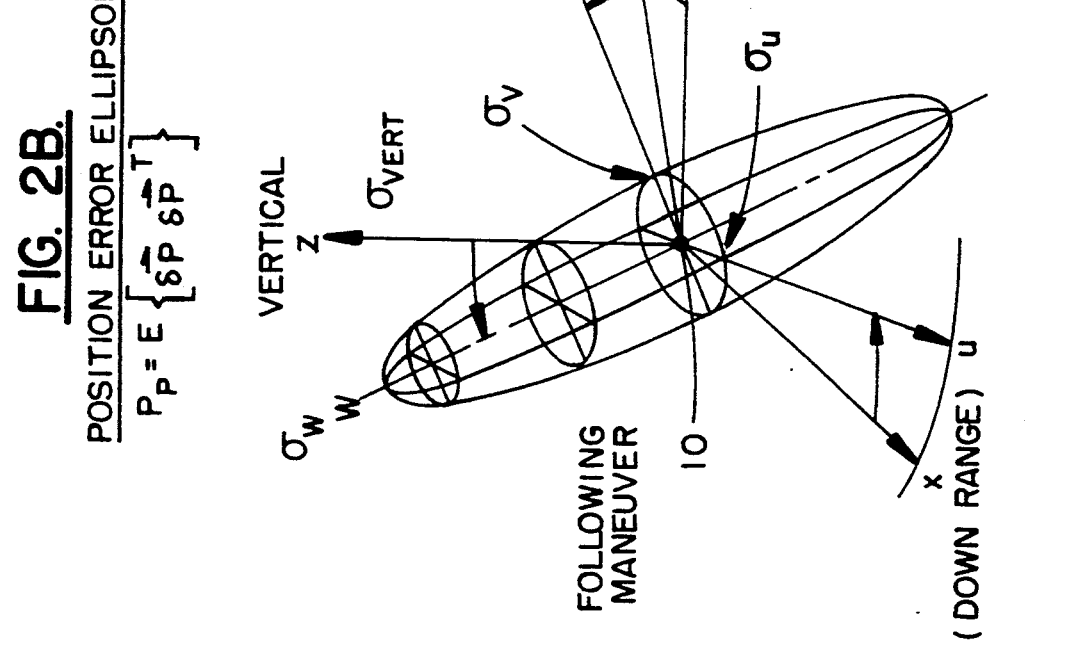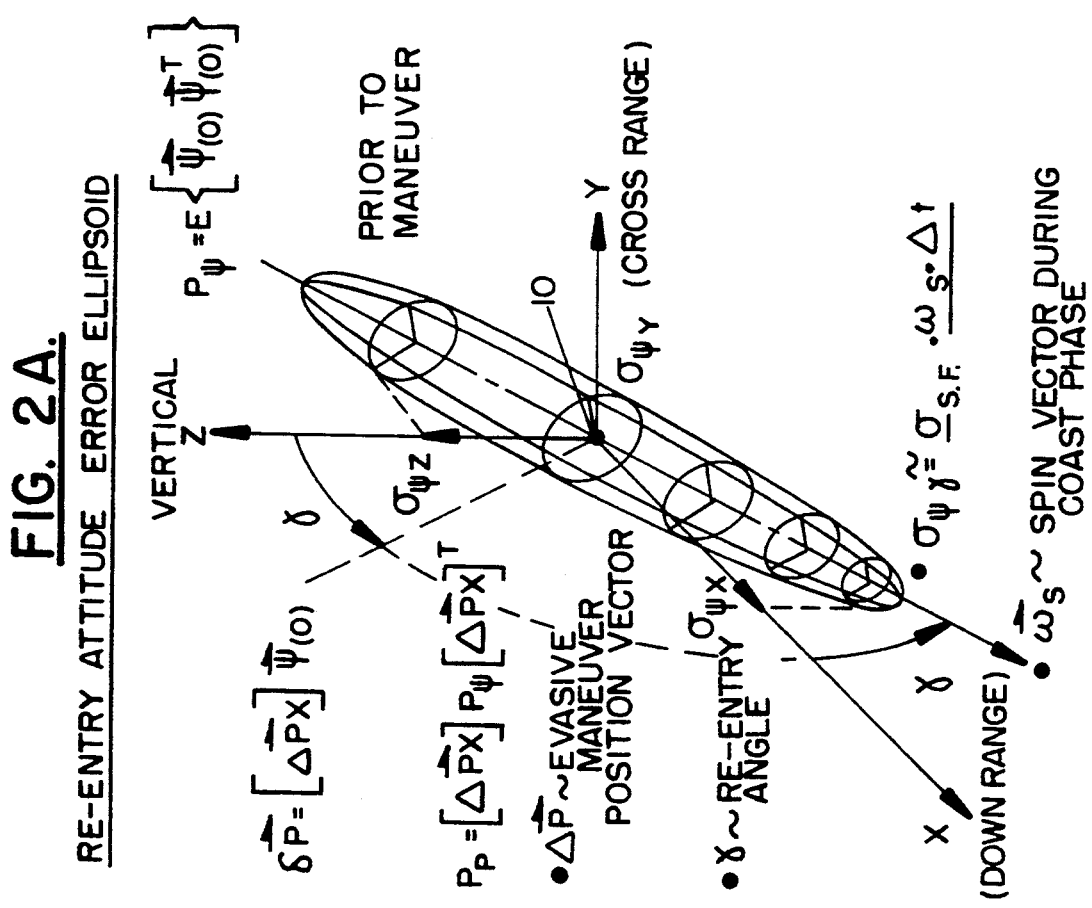

POSITION AIDED EVADER MANEUVERING RE-ENTRY VEHICLE NAVIGATOR

FIELD OF THE INVENTION

This invention relates generally to re-entry vehicles and, in particular, to method and apparatus for providing a three-axes position and velocity correction to a maneuvering re-entry vehicle by use of an altitude measurement taken subsequent to a maneuvering operation.

BACKGROUND OF THE INVENTION

One type of atmospheric re-entry vehicle (RV) is a ballistic RV which, after an initial launch and boost phase, follows a substantially purely ballistic path after separation from a launch vehicle. That is, the position of the RV target can be predetermined if the velocity of the RV and if the boost phase trajectory is known. One disadvantage associated with a purely ballistic RV is that, inasmuch as the target position can be predetermined after separation, interception of the RV can be readily accomplished.

To improve survivability, it is thus desirable to provide an improved type of RV which is an evader maneuvering RV (EMRV) capable of executing in-flight evasive maneuvering operations after re-entry. Inasmuch as the trajectory of the EMRV after re-entry would not be required to be purely ballistic, the position of the EMRV's target would remain uncertain until the completion of the maneuverers. Thus, interception of the EMRV would be made difficult to accomplish.

Such an EMRV would include a suitable maneuvering capability and also a three-axes navigation system for guidance. Preferably, the navigation system would employ a strap-down inertial navigator having ring laser gyroscopes (RLGs) which are inherently more rugged and capable of executing high-G maneuvers than are conventional mechanical gyroscopes. One purpose of the navigation system is to maintain EMRV position information during evasive maneuvering such that the EMRV can be guided to a target at the completion of maneuvers. The EMRV would also typically include an altitude measuring system, such as a radar altimeter, in order to fuse the EMRV's ordinance at a predetermined altitude.

Following the boost phase, and during a coast phase, the EMRV is spin stabilized. As can be appreciated, even with the greatly improved scale factor stability which is obtainable with modern RLGs, a high-G EMRV maneuvering phase will result in a significant EMRV position error at the completion of maneuvering due to the loss of altitude reference during the spin stabilized coast phase. If uncorrected, the computed position of the target relative to the EMRV will also be in error. Known techniques of compensating for the altitude reference error prior to high-G maneuver, or alternatively for the position error following the high-G maneuver are generally inappropriate in an EMRV due to at least the increased weight and complexity associated with such correction systems.

It is therefore one object of the invention to provide a three-axes position and a velocity correction to an inertial navigator.

It is another object of the invention to provide an EMRV with a three-axes position and a velocity correction at the completion of a maneuvering phase in order that the EMRV can be accurately guided to a desired location.

It is another object of the invention to provide an EMRV with a three-axes position and a velocity correction which does not require an appreciable increase in either the weight or complexity of the EMRV and which furthermore may be accomplished in a relatively brief interval of time.

It is one more object of the invention to provide an EMRV with a three-axes position and a velocity correction which does not require an appreciable increase in either the weight or complexity of the EMRV and which furthermore may be accomplished in a relatively brief interval of time by making an altitude measurement and processing the measurement to determine position and velocity corrections.

SUMMARY OF THE INVENTION

The foregoing problems are overcome and the objects of the invention are met by a navigation system for an EMRV which is constructed and operated in accordance with the invention. In an illustrative embodiment of the invention there is disclosed a navigation system for an EMRV which includes a three-axes inertial navigator. A radar altimeter, which is normally provided on the EMRV, provides an output (h) to the navigation system; the output being expressive of the altitude of the EMRV from the earth's surface. The altitude measurement output (h) is processed by a statistical filter, such as a Kalman filter, in conjunction with the inertial solution ($\bar{X}$) from the inertial navigator. The output of the filter is an estimated position and velocity correction which is combined with the inertial position and velocity output of the navigator to yield a corrected position and velocity output. It is shown that a single altitude measurement is sufficient to derive three position and three velocity compensations for the EMRV navigation system.

In accordance with a method of the invention there is disclosed, in an atmospheric reentry vehicle, a method of determining a difference between an inertially determined position of the vehicle and an actual position of the vehicle. The method includes the steps of (a) determining an inertially generated vehicle position, including an inertially generated vehicle altitude above a reference plane; (b) measuring an altitude of the vehicle above the reference plane; (c) generating an estimated correction to the vehicle position and velocity as a function of the difference between the measured altitude and the inertially generated altitude; and (d) combining the estimated corrections with the inertially generated vehicle position and velocity to obtain a corrected position and velocity of the vehicle.

BRIEF DESCRIPTION OF THE DRAWING

The foregoing and other aspects of the invention will be made more apparent in the ensuing Detailed Description of the Invention when read in conjunction with the attached Drawing, wherein:

FIG. 1 illustrates a desired and an actual path of an EMRV after a ballistic phase and during a maneuvering phase of flight;

FIG. 2a illustrates the attitude error ellipsoid ($P_\psi$) associated with an EMRV at the completion of the spin stabilized coast phase;

FIG. 2b illustrates the positional error ellipsoid ($P_p$) associated with an EMRV at the completion of the maneuvering phase of flight, the transformation of the attitude error ellipsoid ($P_\psi$) into the position error ellipsoid ($P_p$) being made through a position maneuver matrix [$\overrightarrow{\Delta PX}$], and;

FIG. 3 shows in block diagram form a portion of an EMRV which embodies the teaching of the invention.

DETAILED DESCRIPTION OF THE INVENTION

Referring first to FIG. 1 there is illustrated an EMRV 10 which, after a ballistic phase of flight, reenters the earth's atmosphere and begins an evasive maneuvering phase of flight. During the maneuvering phase the actual path of the EMRV may deviate from an inertially determined path as indicated by an on board three-axes strap-down inertial navigator. This difference between the actual and the inertially measured paths is due at least in part to the high-G maneuvers executed by the EMRV 10 with attitude reference errors. At the completion of the maneuvering phase of flight it is required that the EMRV be guided to a desired location. Therefore, the error between the actual position and the inertially determined position must be corrected.

At the completion of the maneuvering phase of flight the error of the EMRV is characterized as an error with three position components and three velocity components. A component of the positional error is a vertical error referenced to the surface of the earth. As will be shown below, the determination of this vertical error component, as obtained by an on board altitude measuring means, such as a radar altimeter, in conjunction with suitable processing means is sufficient to compensate for the three position and three velocity error components.

Referring to FIG. 2a there is shown in greater detail the EMRV 10 at the completion of the spin stabilized phase of flight. As can be seen, associated with the EMRV 10 is an error ellipsoid which defines the EMRV 10 attitude error, $\overline{\psi}(o)$, prior to atmospheric reentry. The standard deviation along the major axis of the error ellipsoid is given by $$\sigma_{\psi y} \approx \sigma_{S.F.} \cdot \Delta t \cdot \omega_S \qquad (1)$$

where $\sigma_{S.F.}$ is the roll RLG scale factor error standard deviation, $\omega_S$ is the spin rate and $\Delta t$ is the coast phase spin duration time.

Furthermore, it can be shown that position errors, defined by $P_p$ (FIG. 2b), at the target location are highly correlated as is also the attitude error. In accordance with the invention it has been determined that a cross axis maneuver correlates down range position error with the vertical position error while pull-up and/or nose-down maneuvers correlate cross axis position error with the altitude error, as described by the similarity transformation:

$$P_p = [\overrightarrow{\Delta Px}] P_\psi [\overrightarrow{\Delta Px}]^T. \qquad (2)$$

A (w, u, v) coordinate frame is shown aligned along the major and the minor axis of the position error ellipsoid.

Furthermore, in accordance with the invention a single altitude measurement, which is processed by a suitable filter, such as a Kalman filter, provides a three-axes position and velocity correction to the EMRV 10. These corrections are readily implemented in a relatively simple manner. All filter gains are preferably pre-calculated and stored prior to the launch of the EMRV 10. Thus, the invention provides an inertial navigator for a high speed maneuvering reentry vehicle which is highly accurate and which is implemented with currently available technology. That is, without the altitude aiding, it can be shown that to provide for the desired positional accuracy, following the maneuvering, that RLGS having a scale factor repeatability of less than 70 parts per billion (ppb) would be required. RLGs having such a scale factor repeatability following long periods of dormancy and nuclear environment during the ballistic boost phase are not presently available.

Referring now to FIG. 3 there is shown in block diagram form a navigation system 12 for an EMRV 10. The navigation system 12 can be seen to include a three-axes inertial navigator 14 which includes RLGs and accelerometers. Preferably, the navigator 14 is a strap-down type of navigator. A radar altimeter 16, which is normally provided on the EMRV 10 in order to fuse the EMRV 10 ordinance at a desired altitude, provides an output (h) to the navigation system 12, the output being expressive of the altitude of the EMRV 10 from the earth's surface. The altitude measurement output (h) is processed by a statistical filter, such as a Kalman filter 18, in conjunction with the inertial solution ($\bar{x}$) from the navigator 14. The output of the filter 18 is an estimated inertial correction which is combined with the inertial position and velocity output of the navigator 14 at a block 20 to yield a corrected position and velocity output. This corrected position and velocity output is employed to steer the EMRV 10 to a desired position following the evasive maneuvering phase of flight.

In accordance with the invention it can be shown that a single altitude measurement is sufficient to derive three position and three velocity compensations for the EMRV 10. As was previously stated, it can be shown that the position errors at the target location are highly correlated as are the EMRV 10 attitude errors at the atmospheric reentry point. The position error $\delta \overrightarrow{P}$, following evasive maneuvering, can be expressed as $$\delta \overrightarrow{P} = \int\int -[\overrightarrow{\psi}(0)X]\overrightarrow{A} = -[\overrightarrow{\psi}(0)X]\int\int \overrightarrow{A} = [\overrightarrow{\psi}(0)X]\Delta \overrightarrow{P}; \qquad (3)$$

where $\overrightarrow{A}$ is the high-G maneuver acceleration.

Since $\overline{\psi}(0)$ and thus $\delta P$ are highly correlated, it can be realized that the altitude error information contains down range and cross range error information following cross axis and nose up/down maneuvers.

Based on these relationships the correction for the position and velocity errors, after an altitude measurement is obtained, is found in accordance with the following expression:

$$\begin{vmatrix} \hat{\bar{x}} \\ \hat{\dot{x}} \end{vmatrix} = \begin{vmatrix} \bar{x} \\ \bar{\dot{x}} \end{vmatrix} + \begin{vmatrix} K_X \\ K_{\dot{X}} \end{vmatrix} (h - \overline{X}_{ALT}); \qquad (4)$$

where $[K_X \; K_{\dot{X}}]^T$ are six precomputed scalars related to the gains of the filter 18; and $(h - \overline{X}_{ALT})$ is a scalar difference between the altimeter 14 measurement (h) and the pure inertial altitude solution.

Thus, the guidance position error between the inertially determined position and the corrected position of the EMRV 10 is given by the expression $$\Delta X \triangleq (\hat{x} - \bar{x}). \qquad (5)$$

Based on the foregoing it can be seen that the invention provides for readily compensating for position and velocity errors of a three-axes inertial navigator. Furthermore, the invention does not require the provision of additional hardware within the EMRV 10. The filtering and other operations may be readily accomplished by algorithms which are implemented in software by a control data processor which is normally included in the EMRV 10. However, if desired the filter 18 and block 20 can be provided as discrete circuitry. Thus, it should be realized that the invention is not to be construed to be limited to only that disclosed above but is instead to be limited only as defined by the appended claims.

What is claimed:

1. In an evasive maneuvering atmospheric reentry vehicle, navigation apparatus comprising:
   three-axis strap-down inertial navigation means having an output expressive of a position and a velocity of the vehicle;
   radar altimeter means having an output expressive of an altitude of the vehicle above the surface of the earth;
   Kalman filter means, having a first input coupled to the output of the inertial navigation means and a second input coupled to the output of the altimeter means, for generating an output expressive of an estimated correction to the vehicle position and to the vehicle velocity in accordance with the expression;

$$\begin{vmatrix} \hat{X} \\ \hat{\dot{X}} \end{vmatrix} = \begin{vmatrix} \overline{X} \\ \overline{\dot{X}} \end{vmatrix} + \begin{vmatrix} K_X \\ K_{\dot{X}} \end{vmatrix}(h - \overline{X}_{ALT});$$

where $[K_X \ K_{\dot{X}}]^T$ are six scalars related to gains of the Kalman filter,
   (h) is the altimeter means output,
   $\overline{X}$ is the position output of the inertial navigation means,
   $\overline{\dot{X}}$ is the velocity output of the inertial navigation means,
   $\overline{X}_{ALT}$ is the inertial navigation means altitude solution,
   $(h - \overline{X}_{ALT})$ is a scalar difference between the altimeter means output (h) and the inertial navigation means altitude solution,
   $\hat{X}$ is the corrected vehicle position, and
   $\hat{\dot{X}}$ is the corrected vehicle velocity; the navigation apparatus further comprising summation means, having a first input coupled to the output of the navigation means and a second input coupled to the output of the Kalman filter means, for summing the output of the navigation means and the output of the generating means to produce a corrected vehicle position $\hat{X}$, a corrected vehicle velocity $\hat{\dot{X}}$ and a guidance position error $\Delta X$, in accordance with $$\Delta X \triangleq (\hat{X} - \overline{X}).$$

2. In an atmospheric reentry vehicle, navigation apparatus comprising:
   inertial navigation means having an output expressive of a position $\overline{X}$, and a velocity, $\overline{\dot{X}}$, of the vehicle, and a position output $\overline{X}_{ALT}$ as an inertial navigation means computed altitude;
   altimeter means having an output (h) expressive of an altitude of the vehicle above a reference point;
   means including a Kalman filter, having a first input coupled to the output of the inertial navigation means and a second input coupled to the output of the altimeter means, for generating an output expressive of an estimated correction to the vehicle position and to the vehicle velocity computed from the difference in altitude inertial altitude between the pure inertial solution and the altimeter output (h); and
   means, having a first input coupled to the output of the navigation means and a second input coupled to the output of the generating means, for combining the output of the navigation means and the output of the generating means to produce a corrected vehicle position, $\hat{X}$, and a corrected vehicle velocity, $\hat{\dot{X}}$,
   in accordance with the expression $$\begin{vmatrix} \hat{X} \\ \hat{\dot{X}} \end{vmatrix} = \begin{vmatrix} \overline{X} \\ \overline{\dot{X}} \end{vmatrix} + \begin{vmatrix} K_X \\ K_{\dot{X}} \end{vmatrix}(h - \overline{X}_{ALT});$$

where
   $[K_X \ K_{\dot{X}}]^T$ are six scalars related to gains of the Kalman filter and $(h - \overline{X}_{ALT})$ is a scalar difference between the altimeter means output (h) and the inertial navigation means altitude solution.

3. Navigation apparatus as set forth in claim 2 wherein the output of the combining means is expressed as a vehicle position guidance error, $\Delta X$, in accordance with the expression $\Delta X \triangleq (\hat{X} - \overline{X})$.

4. In an atmospheric reentry vehicle, a method of determining a correction between an inertially determined position of the vehicle and an actual position of the vehicle, comprising the steps of:
   determining an inertially generated vehicle position, $\overline{X}$, including an inertially generated vehicle altitude, $\overline{X}_{ALT}$, above a reference point;
   measuring an altitude (h) of the vehicle above the reference point;
   generating an estimated correction to the vehicle position as a function of at least a difference between the measured altitude and the inertially generated altitude by applying the determined inertially generated position and the measured altitude to a Kalman filter; and
   combining the estimated correction with the inertially generated vehicle position to obtain a corrected position of the vehicle in accordance with the expression $$\begin{vmatrix} \hat{X} \\ \hat{\dot{X}} \end{vmatrix} = \begin{vmatrix} \overline{X} \\ \overline{\dot{X}} \end{vmatrix} + \begin{vmatrix} K_X \\ K_{\dot{X}} \end{vmatrix}(h - \overline{X}_{ALT});$$

where
   $[K_X \ K_{\dot{X}}]^T$ are six scalars related to gains of the Kalman filter and $(h - \overline{X}_{ALT})$ is a scalar difference between the altitude (h) and the inertially generated altitude.

5. A method as set forth in claim 4 wherein the vehicle position guidance error is given by $\Delta X$ in accordance with the expression $$\Delta X \triangleq (\hat{X} - \overline{X}).$$

6. In an atmospheric reentry vehicle, navigational apparatus for determining a correction between an inertially determined position of the vehicle and an actual position of the vehicle, comprising:

means for determining an inertially generated vehicle position, $\overline{X}$, including an inertially generated vehicle altitude, $\overline{X}_{ALT}$, above a reference point;

means for measuring an altitude (h) of the vehicle above the reference point;

means for generating an estimated correction to the vehicle position as a function of at least a difference between the measured altitude and the inertially generated altitude by applying the determined inertially generated position and the measured altitude to a Kalman filter; and means for combining the estimated correction with the inertially generated vehicle position to obtain a corrected position of the vehicle in accordance with the expression $$\begin{vmatrix} \hat{X} \\ \hat{\dot{X}} \end{vmatrix} = \begin{vmatrix} \overline{X} \\ \overline{\dot{X}} \end{vmatrix} + \begin{vmatrix} K_X \\ K_{\dot{X}} \end{vmatrix} (h - \overline{X}_{ALT});$$

where $[K_X \; K_{\dot{X}}]^T$ are six scalars related to gains of the Kalman filter and $(h - \overline{X}_{ALT})$ is a scalar difference between the altitude (h) and the inertially generated altitude.

* * * * *